United States Patent [19]
Kyuma et al.

[11] Patent Number: 5,835,973
[45] Date of Patent: Nov. 10, 1998

[54] INSTRUCTION PROCESSING UNIT CAPABLE OF EFFICIENTLY ACCESSING THE ENTIRE ADDRESS SPACE OF AN EXTERNAL MEMORY

[75] Inventors: Yuriko Kyuma, Kawasaki; Yasuo Yamada, Tokyo, both of Japan

[73] Assignee: Kabushiki Kaisha Toshiba, Kawasaki, Japan

[21] Appl. No.: 696,103

[22] Filed: Aug. 14, 1996

Related U.S. Application Data

[63] Continuation of Ser. No. 307,108, Sep. 16, 1994, abandoned, which is a continuation of Ser. No. 872,471, Apr. 23, 1992, abandoned.

[30] Foreign Application Priority Data

Apr. 25, 1991 [JP] Japan ................................. 3-095843

[51] Int. Cl.⁶ ....................................................... G06F 12/06
[52] U.S. Cl. ............................ 711/220; 711/202; 711/212
[58] Field of Search ................................ 395/402, 421.1, 395/421.4, 421.04, 421.02, 412, 561; 711/2, 220, 214, 212, 202

[56] References Cited

U.S. PATENT DOCUMENTS

| | | | |
|---|---|---|---|
| 3,657,705 | 4/1972 | Mekota, Jr. et al. | 395/375 |
| 3,976,976 | 8/1976 | Khosharian | 395/425 |
| 4,090,237 | 5/1978 | Dimmick | 395/800 |
| 4,206,503 | 6/1980 | Woods et al. . | |
| 4,449,184 | 5/1984 | Pohlman, III et al. | 395/275 |
| 4,615,006 | 9/1986 | Hirano | 711/202 |
| 4,805,092 | 2/1989 | Ceratti | 395/400 |
| 4,959,778 | 9/1990 | Miyadera et al. . | |

FOREIGN PATENT DOCUMENTS

A-0248436  12/1987  European Pat. Off. .

OTHER PUBLICATIONS

"Hewlett–Packard Precision Architecture: The Processor", M.J. Mahon et al., Hewlett–Packard Journal, vol. 37, No. 8, Aug. 1986, pp. 4–21.

"The Z80000 Microprocessor", D. Phillips, IEEE Micro, vol. 5, No. 6, Dec. 1985, pp. 23–36.

*Hitachi Corporation Programming Manual* (Jun. 1989) 2nd Ed:5, 9, describes the Hitachi single chip microcomputer, built–in register and cooperation of page register, PC or general register.

*Microprocessor and Peripheral Handbook* (1988) 1:2–7/2–12, describes the memory organization and 8086 register model.

*Zilog Data Book* (Sep. 1983), 140–142, describes the general purpose register, CPU special register and logical–to–physical address transformation.

*Primary Examiner*—Richard L. Ellis
*Attorney, Agent, or Firm*—Foley & Lardner

[57] ABSTRACT

In an instruction processing unit, a first register group having at least one register whose bit width is enough for designating a desired address in the entire address space of a memory, and a second register group having at least one register whose bit width is not enough for said purpose, and operation means are provided. This operation means further includes first and second address generation means. In this unit, the first address generation means creates a desired operand address according to values stored in one or more registers in the first register group. The second address generation means creates an operand address to designate a desired partial space of the memory, by extending the bit width of a register in the second register group by a required amount.

20 Claims, 12 Drawing Sheets

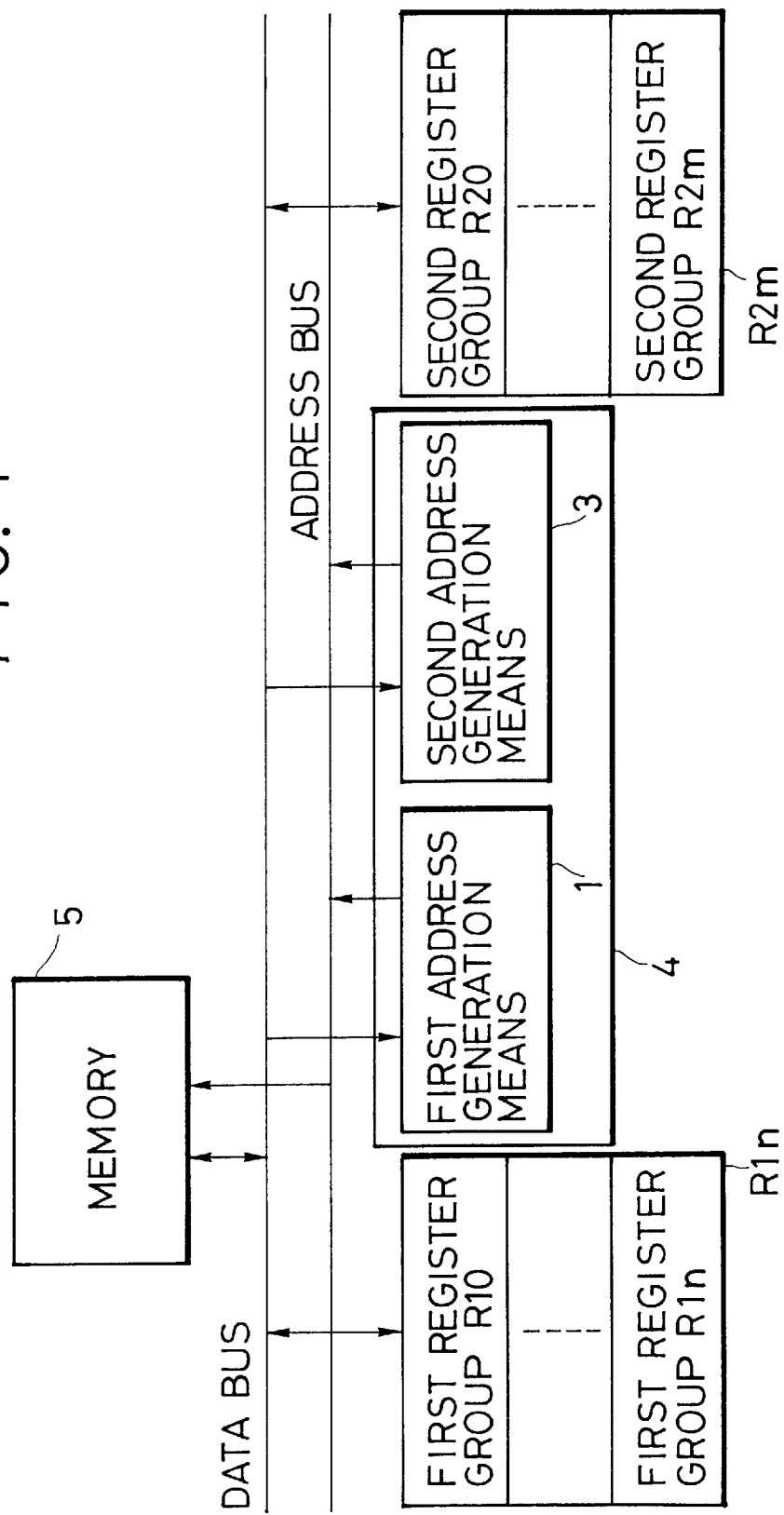

| | | |
|---|---|---|
| Rd 0 | Rw 1 | Rw 0 |
| Rd 2 | Rw 3 | Rw 2 |
| Rd 4 | Rw 5 | Rw 4 |
| Rd 6 | Rw 7 | Rw 6 |
| Rd 8 | Rw 9 | Rw 8 |
| Rd 10 | Rw 11 | Rw 10 |
| Rd 12 | Rw 13 | Rw 12 |
| Rd 14 | Rw 15 | Rw 14 |
| | 31    16 | 15    0 |

(a) PROGRAM STATUS REGISTER(Z8001)

(b) PROGRAM STATUS AREA POINTER (Z8001)

INSTRUCTION PROCESSING UNIT CAPABLE OF EFFICIENTLY ACCESSING THE ENTIRE ADDRESS SPACE OF AN EXTERNAL MEMORY

This application is a continuation of application Ser. No. 08/307,108, filed Sep. 16, 1994, now abandoned, which is a continuation of Ser. No. 07/872,471, filed Apr. 23, 1992, now abandoned.

BACKGROUND OF THE INVENTION

1. Field of the Invention

This invention relates to an instruction processing unit such as a microprocessor. In particular, it relates to an instruction processing unit which is efficiently able to access an address space.

2. Description of the Prior Art

Due to the rapid advancement of semiconductor technology in recent years, the address space used by microprocessors has become larger and larger. The performance of microprocessors, therefore, depends on how to carry out an efficient access to an address space.

The H 8/500 microcomputer by HITACHI has a control register CR, which is shown in FIG. 7a, and general purpose registers Rn (n=0~7), which are shown in FIG. 7b. In this microcomputer, as shown in FIG. 8, four 8 bit page registers in the control register, i.e., a code-page register CP, a data-page register DP, an extend-page register EP, and a stack-page register TP, are combined with 16 bit general purpose registers or program counters PC, in order to generate a 24 bit effective address. A 16 bit address space is accessible with this effective address. In other words, the 16 bit address space is divided into 256 pages, each of which is comprised of 64K bytes. To access each page, the four registers designate which page should be used.

In the above microcomputer, however, the page-register does not increment automatically when the address comes into the next page. Accordingly, a program has to be completed within a 64K byte page. As a result, the operating efficiency of the memory becomes deteriorated and the manipulation of memory becomes complicated.

As shown in FIG. 9a, the microcomputer 8086 by Intel has a code segment register CS, a data segment register DS, a stack segment register SS, and an extra-segment register ES as segment registers. As shown in FIG. 9b, this microcomputer also includes the following: general purpose registers AX, BX (these are the basic registers), CX and DX; four pointer/index registers, i.e., a stack pointer register SP, a base pointer register BP, a source index register SI, and a destination index register DI; and status/control registers, i.e., an instruction pointer register IP and a flag register. In this microcomputer, to access into an 1 M byte address space, a segment base address, which is created by shifting a 16 bit segment selector towards left by 4 bits, is added to a 16 bit segment offset so as to generate a 20 bit effective address, as shown in FIG. 10.

In the above microcomputer, any one of the four segment registers is used to be the segment selector, and any one of the base register BX, the four pointer/index registers, the instruction pointer register IP, or a displacement contained in an instruction is used to be the segment offset. In this case, however, only a program or data which is completed within 64K bytes can be operated in one segment. Accordingly, the operating efficiency of memories in this microcomputer becomes deteriorated.

The microprocessor Z 8001 by Zylog has sixteen 16 bit general purpose registers R0-R15 (shown in FIG. 11a), and special purpose registers (shown in FIG. 11b). In order to carry out an access into an 8 M byte address space, as shown in FIG. 12, a 7 bit segment SEG and a 16 bit offset OFFSET, which are contained in a register pair made of two general purpose registers, are combined with each other so as to generate a 23 bit effective address.

In the microprocessor Z 8001, there is another operating mode in which a 64K bit address space can be accessed by only a 16 byte offset. In this case, the segment mode bit SEG, which is contained in the flag control language of the special purpose registers shown in FIG. 11b, is used to select this mode. Within the range of 64K bytes, bit SEG is set to a non-segment mode, and only a 16 bit offset made by a general purpose register is used to carry out an access. On the other hand, in the range above 64K bytes, bit SEG is set to a segment mode so as to connect a 7 bit segment with a 16 bit offset within two general purpose registers connected with each other, in order to carry out an access to the address space. In this case, however, the switching of a segment during operation is not expected. So, bit SEG is fixed to a segment mode when it is used for the address space above 64K bytes.

In that case, similar to the cases mentioned before, programs and data have to be closed within 64K bytes, because segments are not influenced by the overflow of the offset. Accordingly, the operating efficiency of the memory becomes deteriorated, and general purpose registers in this processor are not used efficiently.

As mentioned above, the instruction processing units, such as the microprocessors, of the prior art have page registers and segment registers in order to access into a widely spread address space. These registers, however, do not have access into the whole address space continuously. Also, in addition to the basic 16 bit registers, the units are required to have one more special purpose register or a segment register for a special use, such as a page register and a segment register. These are the big disadvantages of the prior art devices.

SUMMARY OF THE INVENTION

This invention has been made to overcome the above mentioned problems of the prior art.

Therefore, the main objective of this invention is to provide an instruction processing unit which is able to have efficient access to a widely spread address space.

The first aspect of the present invention is to provide an instruction processing unit which is shown in FIG. 1 and includes: a first register group R1n having at least one register whose bit width is enough for designating a desired address in the entire address space of a memory 5; a second register group R2m having at least one register whose bit width is not enough for designating a desired address in the entire address space of said memory; and operation means 4 having a function to create operand addresses according to values which are stored in a register or registers connected together in the first or second register group R1n or R2m. The registers are specified by instruction words. The operation means further includes a first address generation means 1 to create a desired operand address according to values which are obtained from all the bits of one or more registers in the first register group, or values which are obtained by extracting a desired amount of bits from one or more registers in the first register group; and second address generation means 3 to create an operand address, for designating addresses in a desired partial space of the entire address space, by creating a required amount of bits, which are deficient for address designation, based on values obtained from a part of bits in one or more registers in the second register group. In this unit, one of the first and second address generation means is selected to be used according to information contained in instruction words. Also, the first and second register groups contain more than two registers respectively, each of which is connected to the other in order to make a register having double bits.

The second aspect of the invention is to provide an instruction processing unit having a first register group R1n having at least one register whose bit width is enough for designating a desired address in the entire address space of a memory 5; a second register group R2m having at least one register whose bit width is not enough for designating a desired address in the entire address space of said memory; and operation means having two functions, one of which is to create an operand address according to values stored in a register or registers connected together in the first or second register group R1n or R2m, the registers being specified by instruction words, and another of which is to create an operand address indirectly according to read out values from the memory 5 which are obtained by accessing the memory 5 using values stored in a register or registers connected together in the first or second register group, the registers being specified by instruction words; wherein the operation means further includes the following; first address generation means 1 to create a desired operand address according to values which are obtained from all the bits of the one or more registers in the first register group, read out values from memory 5, or values which are obtained by extracting a required amount of bits from the two kinds of values; and second address generation means 3 to create an operand address, which is to designate a desired partial space of the entire address space, by creating a required amount of bits, which are deficient for address designation, based on a part of bit values which are obtained from one or more registers in the second register group or values which are obtained from read out data from memory 5. In this unit, one of the first and second address groups is selected to be used according to information contained in instruction words. Also, the first and second register groups contain more than two registers respectively, each of which is connected to the other in order to make a register having double bits.

The third aspect of the present invention covers the multiple execution of the function which is to create an operand address indirectly, in the instruction processing unit according to the second aspect of this invention. That is, as mentioned above, memory 5 is accessed according to values stored in one or more registers in the first or second register group R1n or R2m. In this case, the registers are specified by instruction words. Using read out values from memory 5 obtained by the memory access, an operand address is created indirectly. The third aspect of the present invention enables to repeat the function.

The fourth aspect of the present invention is to create an operand address for a desired partial space of the entire address space in the following way. That is, in the instruction processing unit according to the first, second, and third aspects of the present invention, the second address generation means 3 creates a desired amount of bits, which are deficient for address specification, by extending the bit width of the highest bit of data, which are read out from one or more registers in second register group R2m, or memory 5.

The fifth aspect of the present invention is to create an operand address for a desired partial space of the entire address space in the following way. That is, in the instruction processing unit according to the first, second, and third aspects of the present invention, the second address generation means 3 creates a desired amount of bits, which are deficient for address specification, based on values obtained from a conversion table, which is prepared in advance. The values obtained from the conversion table are specified according to a part of the bit values of data, which are read out from one or more registers in the second register group or from memory 5.

According to the aspects of this invention, a desired operand address is created by the first address generation means 1, based on all the bit values contained in one or more registers in the first register group, values which are read out from memory 5, or values which are obtained by a desired amount of bits from the those values. A desired operand address, which is to specify a desired partial space in the whole address space, is created by second address generation means in the following way. That is, in order to supplement deficient bits for address designation, new bits are created first corresponding to a part of bit values of one or more registers in the second register group, or corresponding to read out data from the memory 5. With these new created bit values, the operand address for a partial space of memory 5 will be generated. In addition, by means of information contained in instruction words, either one of the first or second address generation means 1 or 3 is selected to be used in this unit.

Particularly, the second aspect of the present invention covers both of the operating modes, one of which is called a register indirect addressing mode and the other is called a memory indirect addressing mode. In the register indirect addressing mode, specified addresses are in the first or second register group R1n or R2m. On the other hand, specified addresses are in the memory 5, in the memory indirect addressing mode. In addition, the third aspect of the present invention realizes a function called a multiple indirect addressing mode, which covers the multiple execution of the register indirect addressing mode and the memory indirect addressing mode.

There may be some ways to supplement deficient bits with the second address generation means 3. For example, the deficient bits for address specification may be created by extending the bit width of the highest bit of data which are read out from one or more registers of the second register group R2m or memory 5. An operand address for a desired partial space of the entire address space is created based on the extended bit values. Or, the deficient bits may be created using a conversion table which is prepared in advance. Values in the conversion table are specified in this case according to a part of bit values of data which are read out from one or more registers in the second register group R2m or memory 5. An operand address for a desired partial space of the entire address space is created based on the bit values thus supplemented.

As mentioned above, the instruction processing unit according to this invention can have continuous access to the whole address space in a memory, without using special purpose registers, such as page registers and segment registers, other than basic registers. As a result, an instruction processing unit, which is able to access efficiently into an address space, can be provided according to the present invention.

These and other objects, features and advantages of the present invention will be more apparent from the following detailed description of preferred embodiment in conjunction with the accompanying drawings.

BRIEF DESCRIPTION OF THE DRAWINGS

FIG. 1 is a view showing the basis principle of this invention;

FIG. 2a is a block diagram showing the structure of a CPU in which an instruction processing unit according to one embodiment of this invention is realized;

FIG. 2b is a view showing the detailed structure of a general purpose register file shown in FIG. 2a;

DETAILED DESCRIPTION OF THE PREFERRED EMBODIMENTS

Figures 2A, 2B:
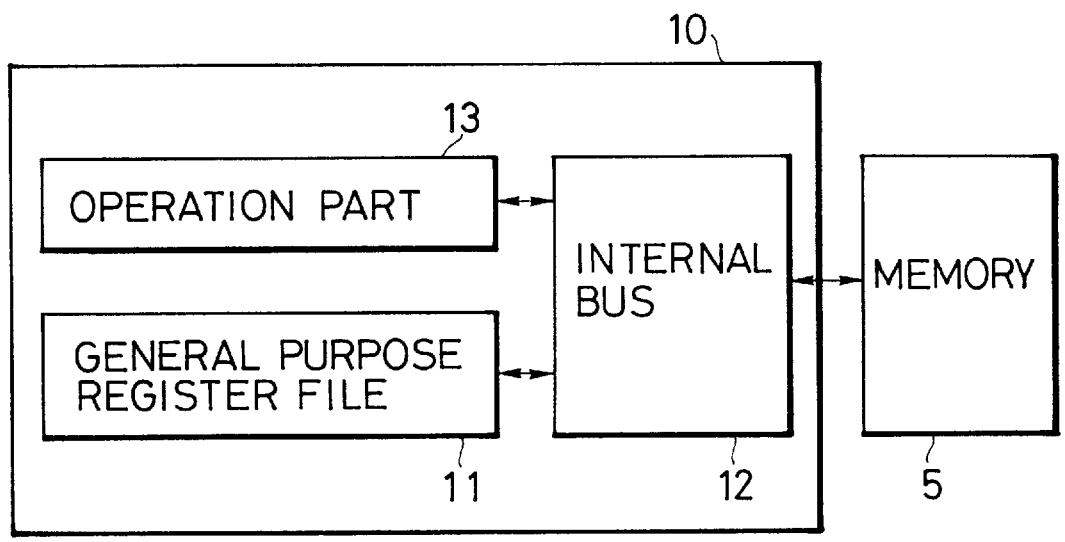

First, the general structure of a CPU core, in which an instruction processing unit according to one embodiment of the present invention is included, will be explained using FIGS. 2a and 2b. As shown in FIG. 2a, CPU core 10 is comprised of the following: a general purpose register file 11 having 16 registers of 16 bits; internal buses 12; and an operation part 13 connected to register file 11 through internal buses 12. By creating 24 bit effective addresses, CPU core 10 can have access to a 16 M byte address space in memory 5. The structure of general purpose register file 11 is shown in FIG. 2b. When file 11 is a set of 16 bit registers, each register Rw0 to Rw15 is specified separately to have access into the address space. On the other hand, when file 11 is used to be a set of 32 bit registers, each even number register Rd0 to Rd14, in which two registers are combined with each other in order to generate a 32 bit register, should be specified.

In the first embodiment, the operation part 13 includes first address generation means 1 (show in FIG. 1) and second address generation means 3 (also, shown in FIG. 1). In this embodiment, first address generation means 1 creates a desired operand address from the following values: all the bit values obtained from 16 bit registers Rw0 to Rw15; values which are read out from memory 5; and/or values which are obtained by extracting a desired bit width out of the values in 32 bit registers Rd0 to Rd14 and out of the read-out values from memory 5. Second address generation means 3 generates the required amount of bits to make up the deficiency for address specification, according to a part of bit values of data which are read-out from 16 bit registers Rw0 to Rw14 or memory 5. With these bits, means 3 generates an operand address for a predetermined space in part of the entire address space. In this embodiment, the bits which make up the deficiency are generated by second address generation means 3 in the following way. That is, the highest bit of the data, which are read-out from 16 bit registers Rw0 to Rw14 or memory 5, is extended to make up the deficiency for the address specification. An operand address, which is used for specifying a predetermined part of the entire address space, is generated from the bits thus supplemented.

Next, the operation of this unit regarding the register indirect addressing mode will be explained.

Figure 3A:
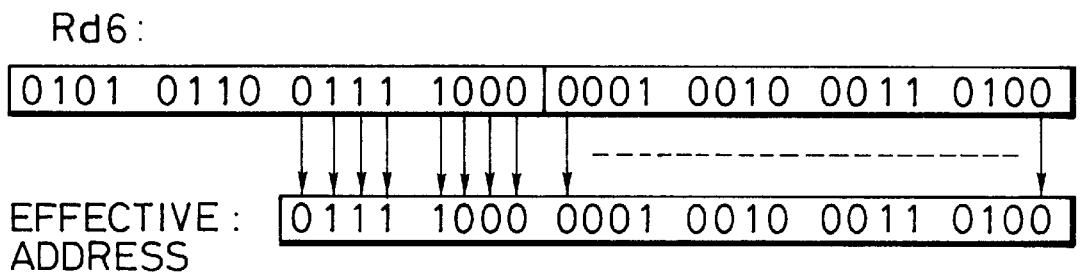
FIGS. 3a, 3b and 3c are views explaining the generation of an effective address by the instruction processing unit according to the first embodiment of this invention.

In this mode, addressing by the first address generation means 1 is generally carried out with a 24 bit effective address, which is created from one of the 32 bit registers Rd0 to Rd14, each of which is made by connecting two 16 bit general purpose registers as mentioned before. In the example shown in FIG. 3a, the higher 8 bits of a 32 bit register are ignored, and rest of the bits, i.e., the 24 bits are used to create an effective address. In the figure, 32 bit register Rd6, which is made by connecting 16 bit general purpose register Rw7 with register Rw6, is specified to generate an effective address.

Figure 3B:
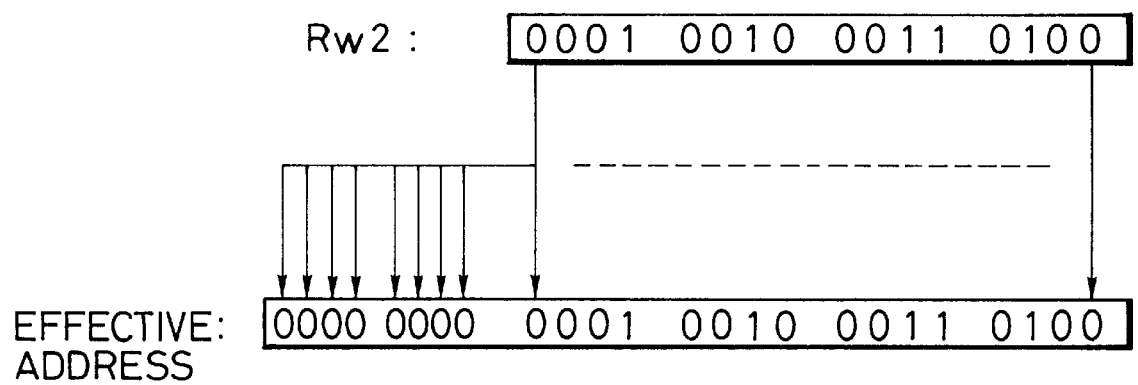
Figure 3C:
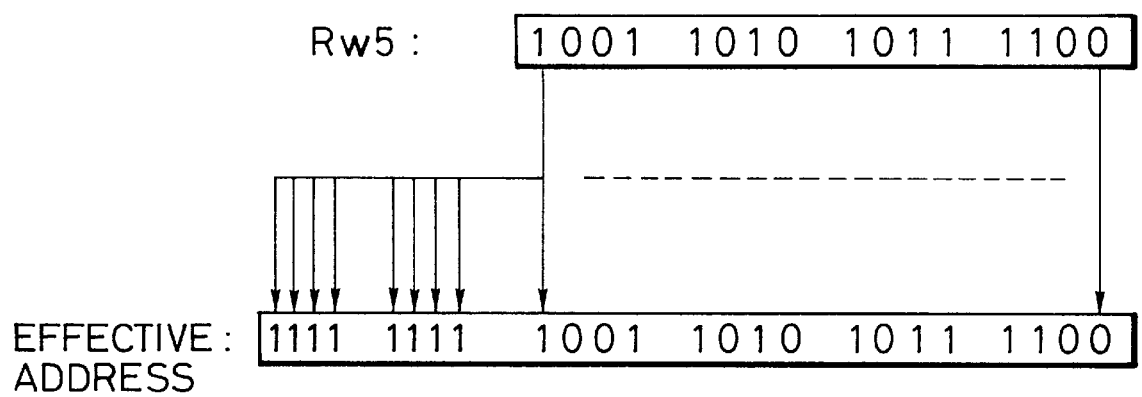

In second address generation means 3, as shown in FIGS. 3b and 3c, any one of the 16 bit registers Rw0 to Rw5, (i.e., Rw2 in the example shown in FIG. 3b and Rw5 in the example shown in FIG. 3c), is specified, and its highest bit is code-extended into 24 bits so as to generate a 24 bit effective address. As a result, a particular area of memory 5 shown in FIG. 4 can be accessed by the effective addresses.

As described above, only a part of the general purpose register is used in this embodiment to access into memory 5. This results in the saving of memory. In other words, when the number of registers used to be an address pointer becomes half, some other operands can be set on the other half of the registers. Accordingly, the number of operands which should be set in memory 5 will decrease by that amount of operands. As a result, the frequency of memory access decreases in this embodiment to enable high speed access. At the same time, the efficiency of this unit is improved.

The operation mode can coexist with the prior operation mode in which two general purpose registers are used. In this embodiment, both of the modes can be switched to the other using an addressing mode. In the memory area shown in FIG. 4, frequently used data can be placed in the range from the front address to 32K byte point (address 000000 to 007FFF) and in the range within the last 32K bytes (address FF8000 to FFFFFF). On the other hand, not frequently used data can be placed in the middle range other than the area mentioned above. Due to this data arrangement, a 16 bit address pointer can coexist efficiently with a 32 bit address pointer. At the same time, an instruction processing unit having a widely spread address space and a register group, in which a large number of registers are included, are realized, according to the data arrangement.

In order to realize the above mentioned coexistence, the register addressing mode may have two kinds of functions, i.e., one is to use a general purpose register alone, and the other is to use two general purpose registers connected with each other. For example, in an assembler language, the function to use a 16 bit general purpose register alone is expressed (Rwn). In this representation, R means a register indirect addressing mode and w means to use one 16 bit register alone. Also, n means the register number. In this embodiment, n takes 0 to 15. On the other hand, the function to use two 16 bit general purpose registers is expressed (Rd2n). In this representation, d means that two registers are connected to be used. And also, 2n means even number registers. For example, if n=5, the 11th register (Rw11), i.e., 2n+1=11, and the 10th register (Rw10), i.e., 2n=10, are connected with each other to designate the 32 bit register. In this embodiment, n takes 0 to 7.

The above mentioned two functions are easily switched with each other according to the designation by the addressing mode. This switching is easily carried out by programming. As a result, both functions can be mixed in one program, thus increasing the efficiency.

Figure 4:
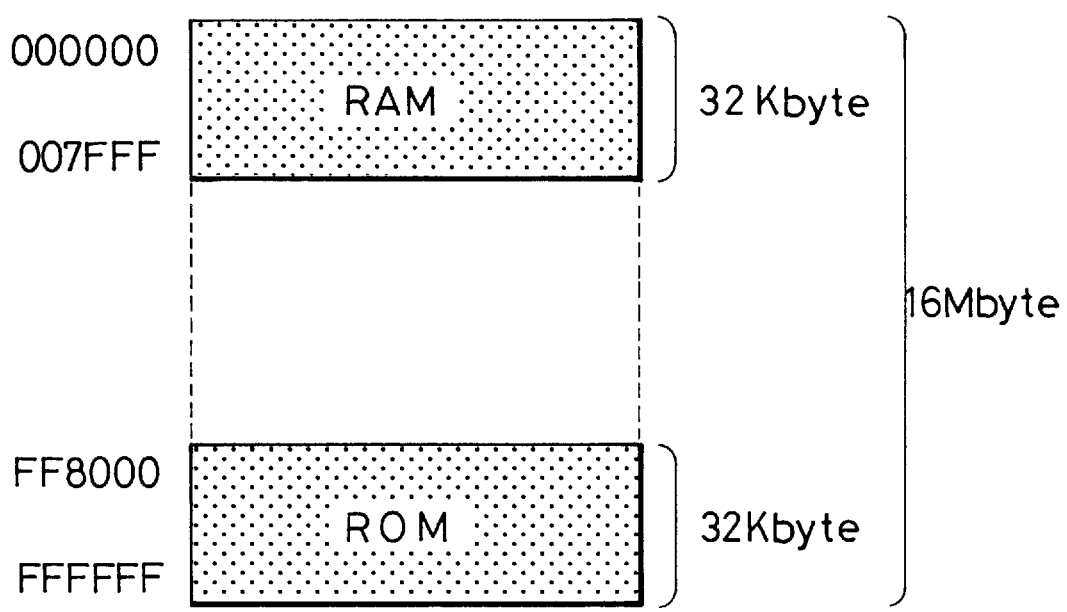
FIG. 4 is a view showing one example of memory arrangement in an address space by the instruction processing unit according to the first embodiment of this invention.

Next, the operation of this unit regarding the memory indirect addressing mode will be explained. In this mode, similar to the case of the register indirect addressing mode, one word (16 bits) of data in memory 5 are read out by second address generation means 3. The highest bit of this word is, then, code-extended into 24 bits to enable an access into a particular area of memory 5 as shown in FIG. 4. As a result, the amount of data, which are required to access into memory 5, are reduced. Memory 5 can, therefore, be used more efficiently. Also, as soon as one word is completely read out, an address pointer is created. This enables a high speed operation of this unit and improves its efficiency.

The above mentioned mode can coexist with another operation mode in which two words (32 bits) are read out by first address generation means 1. In this two word mode, the higher 8 bits contained in the two words (32 bits) are ignored, and the rest 24 bits are used to make an address pointer. In a real use, similar to the case of the register indirect addressing mode, both modes (one word mode and two words mode) can be switched with each other by the addressing mode. Thus, the object efficiency of this mode is greatly improved.

The second embodiment of this invention will be explained next. The general structure of the second embodiment is almost the same as that of the first embodiment. This embodiment is, however, characterized by its system to supplement deficient bits using second address generation means 3. In other words, one word data are read out first from any one of 16 bit registers Rw0 to Rw15. The higher 3 bits of the data are, then, used to specify values in a conversion table 17 shown in FIG. 5. Based on the values thus specified, second address generation means 3 creates said deficient bits, in order to generate an operand address for a particular area of the entire address space.

Figure 5:
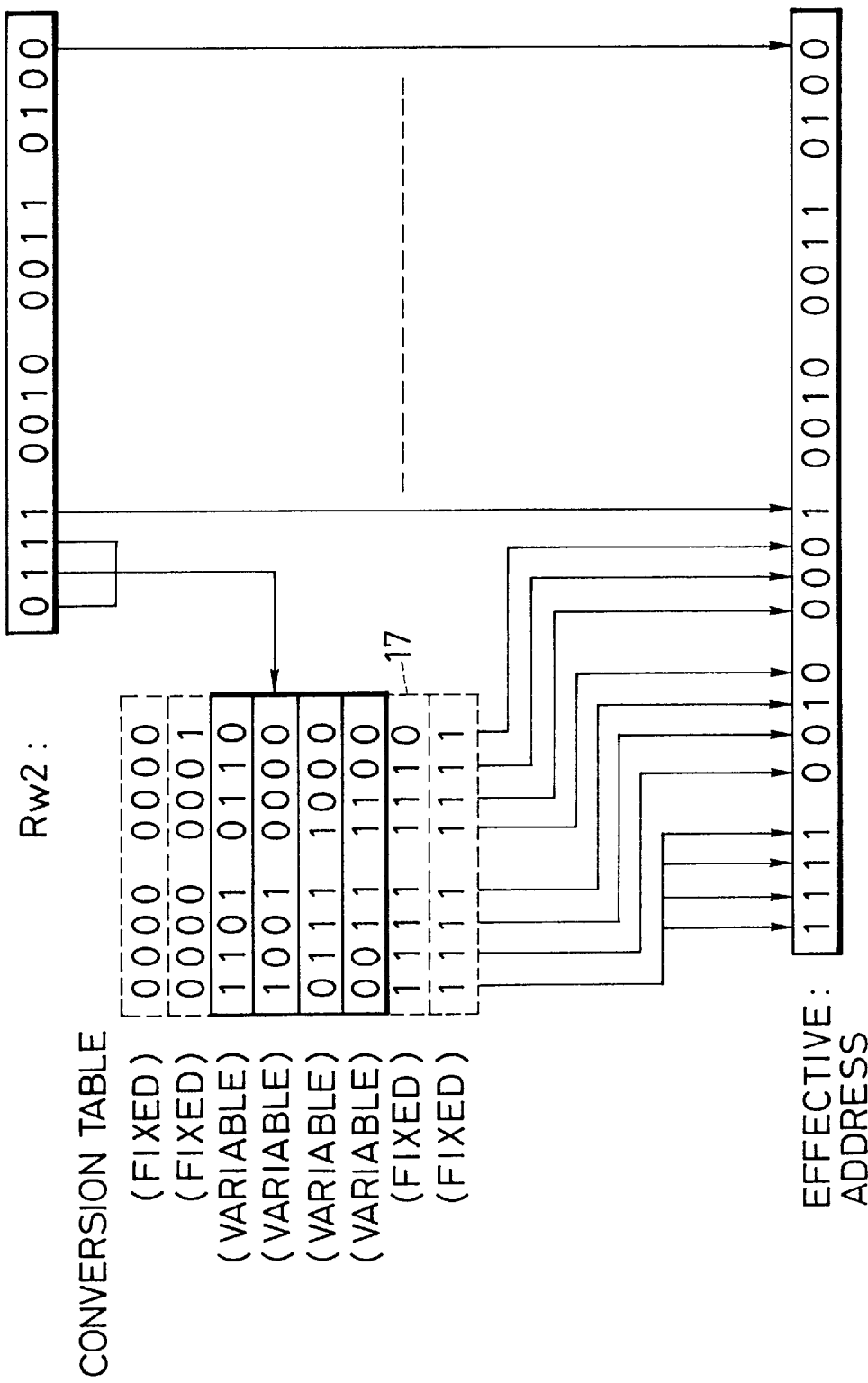
FIG. 5 is a view explaining the generation of an effective address by the instruction processing unit according to the second embodiment of this invention.

For example, as shown in FIG. 5, a conversion table 17 having eight kinds of 8 bit addresses is prepared in advance. A desired address shown in table 17 is specified using the higher 3 bits of a 16 bit general purpose register (i.e., Rw2 in FIG. 5). The 8 bit address in table 17 thus specified is, then, connected in front of the rest 13 bits of the 16 bit general purpose register. At the same time, the highest bit of the 8 bit address is code-extended by 3 bits. In address conversion table 17, table values specified by '000' and '001' and specified by '110' and '111' are fixed to the 8 bit addresses shown in FIG. 5. On the other hand, table values of the rest four kinds can be set to a desired value in order to specify desired 8 bit addresses.

Figure 6:
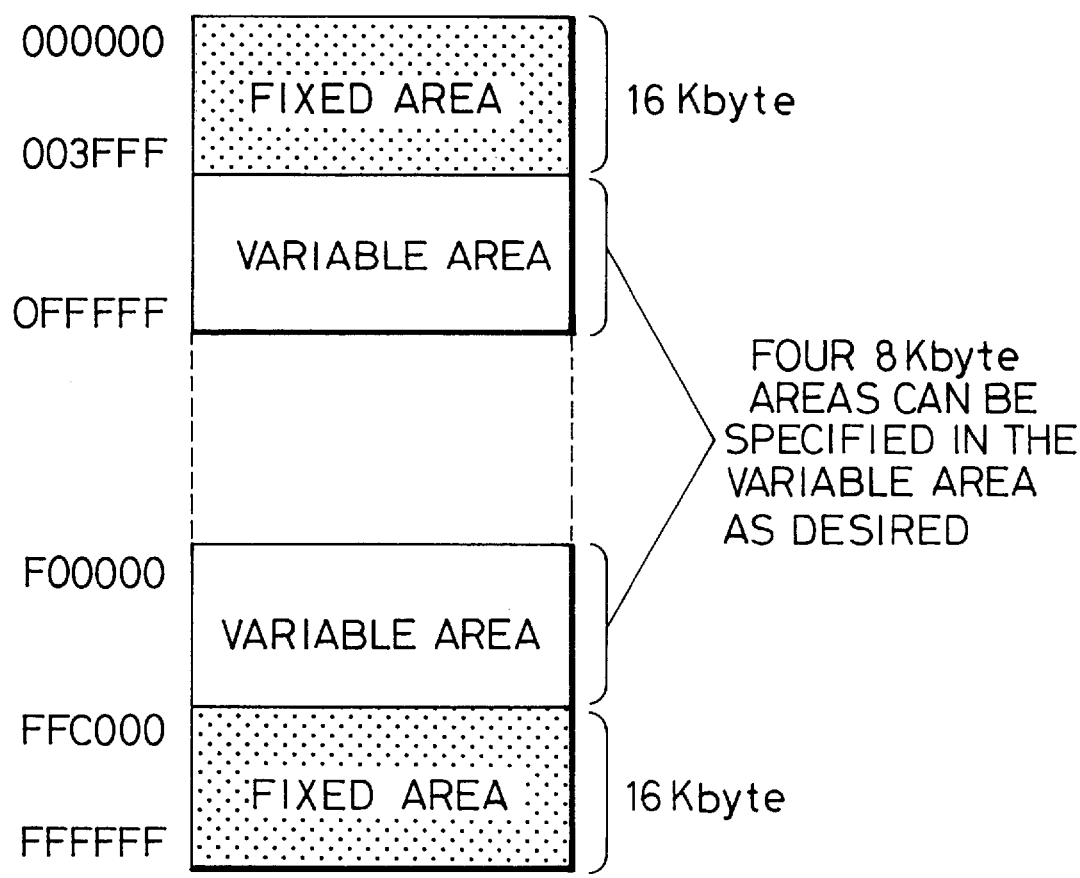
FIG. 6 is a view showing one example of memory arrangement in an address space by the instruction processing unit according to the second embodiment of this invention.
Figure 7A:
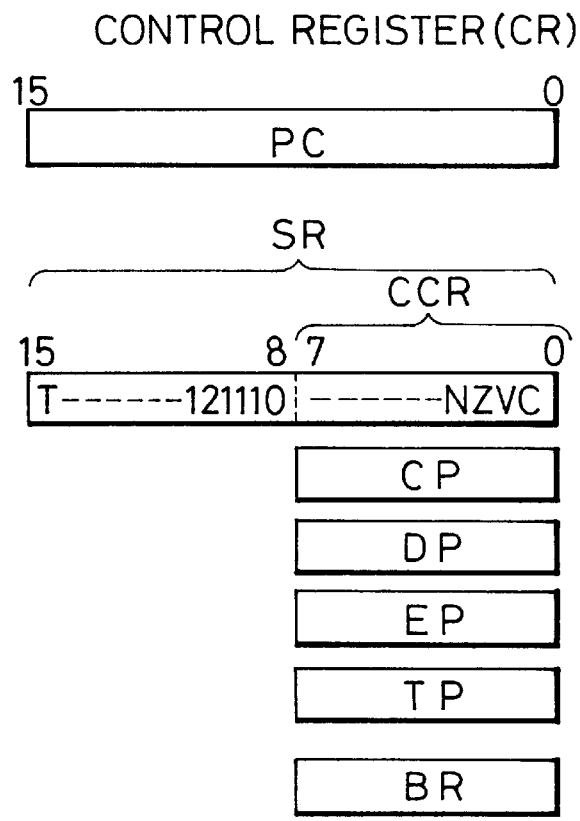
FIG. 7a is a view showing the structure of a control register according to the first example (H 8/500) of the prior art device of this invention.
Figure 7B:
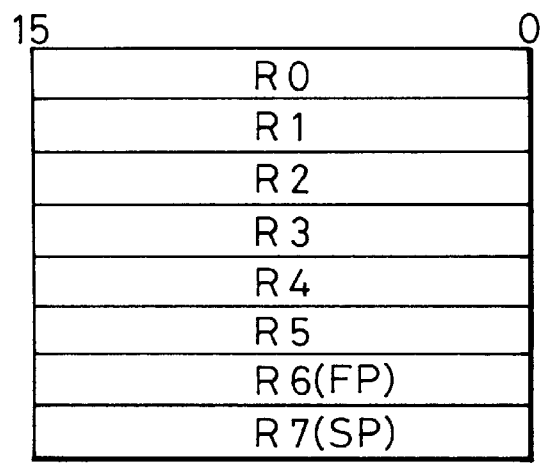
FIG. 7b is a view showing the structure of a general purpose register used in the first example.
Figure 8:
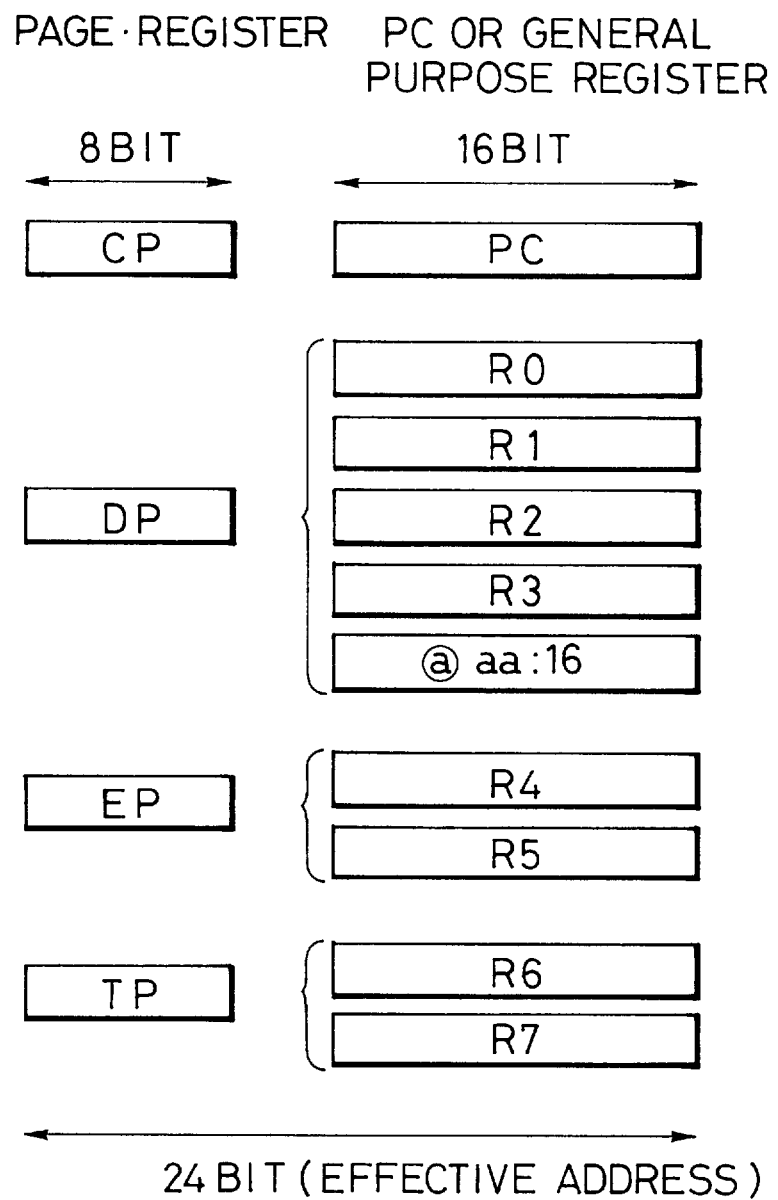
FIG. 8 is a view explaining the generation of a 24 bit effective address according to the first example (H 8/500) of the prior art device.
Figure 9A:
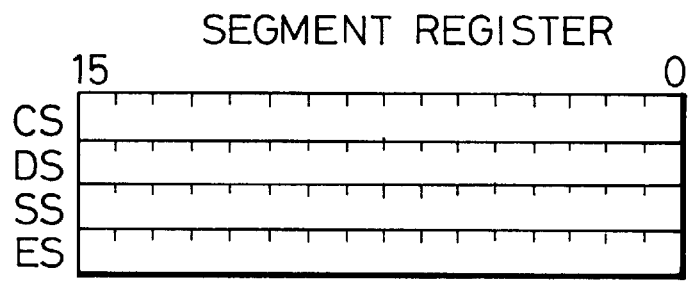
FIG. 9a is a view showing the structure of a segment register which is included in the second example (8086) of the prior art device of this invention.
Figure 9B:
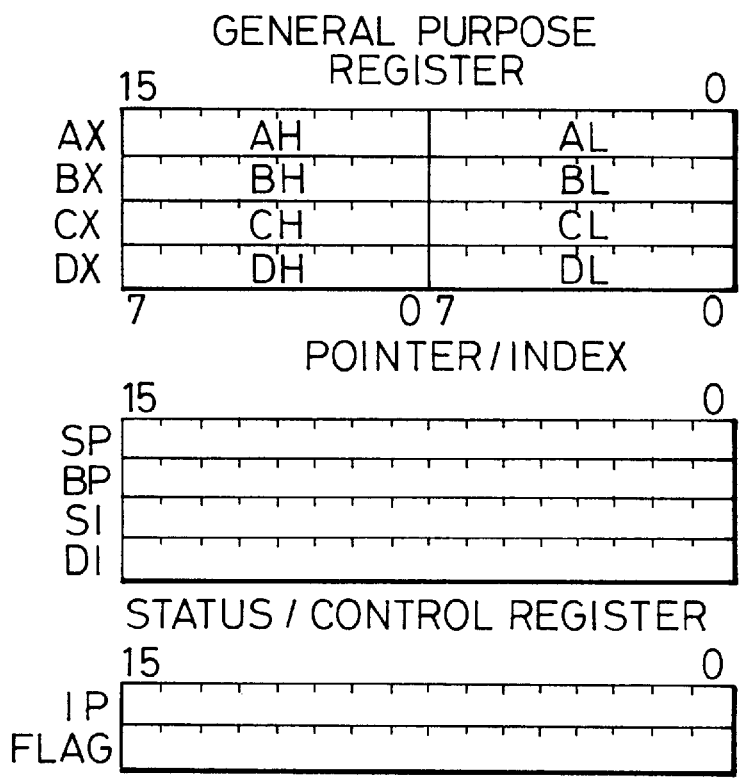
FIG. 9b is a view showing the structure of a general purpose register, pointer/index register, and a status/control register, which are included in the second example of the prior art device of this invention.
Figure 10:
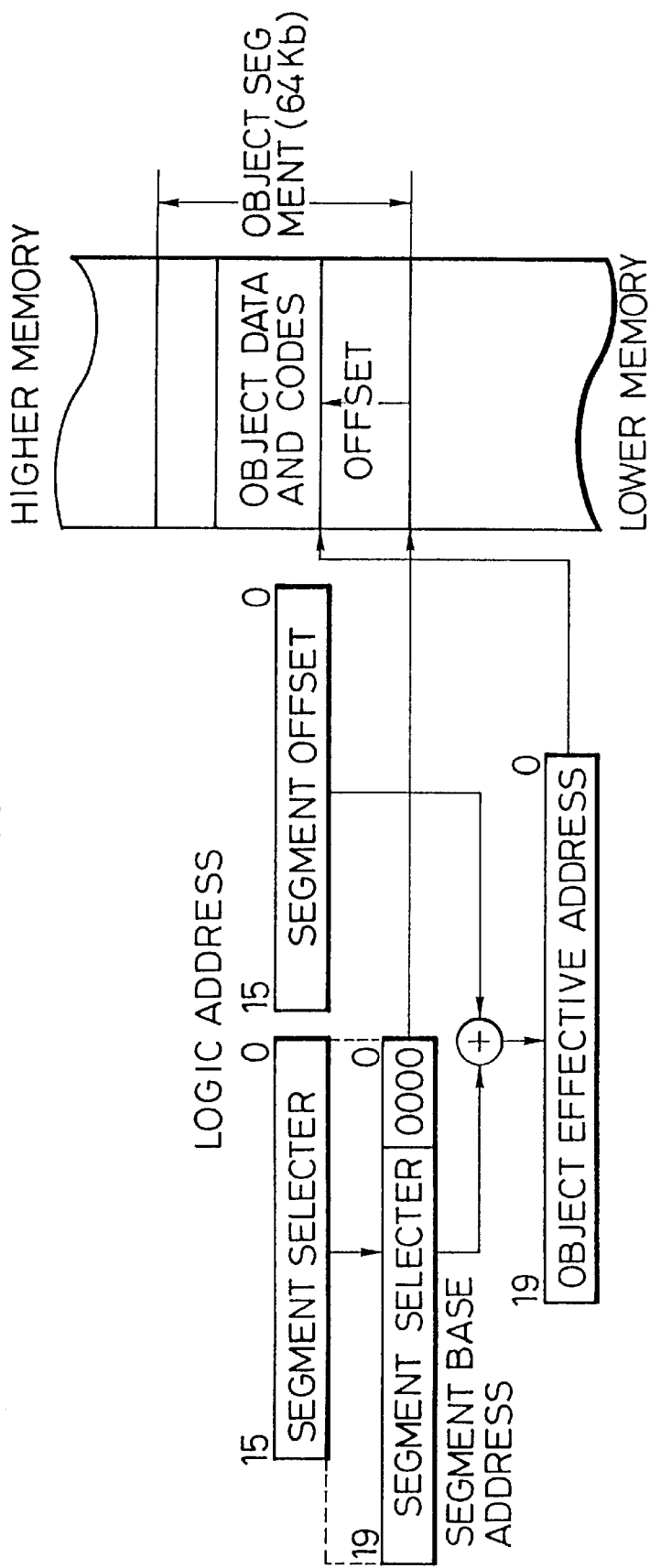
FIG. 10 is a view explaining the generation of a 24 bit effective address by the second example of the prior art device.
Figure 11A:
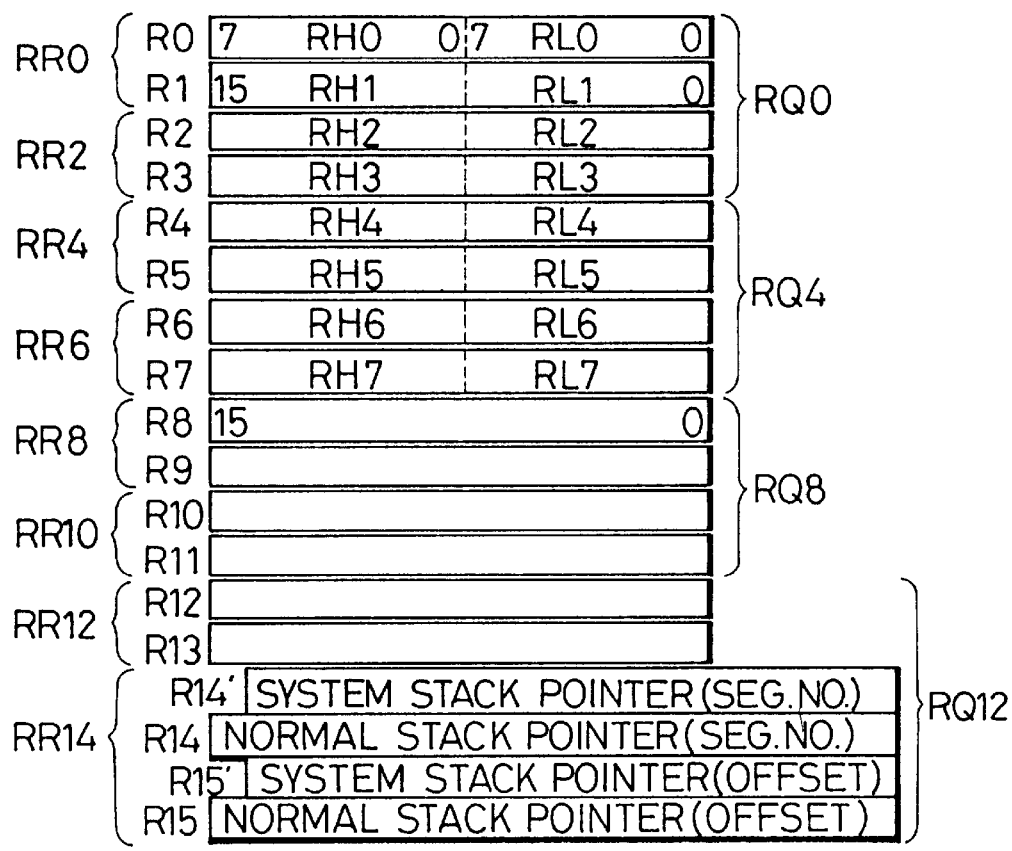
FIG. 11a is a view showing the structure of a general purpose register which is included in the third example (Z 8001) of the prior art device of this invention.
Figure 11B:
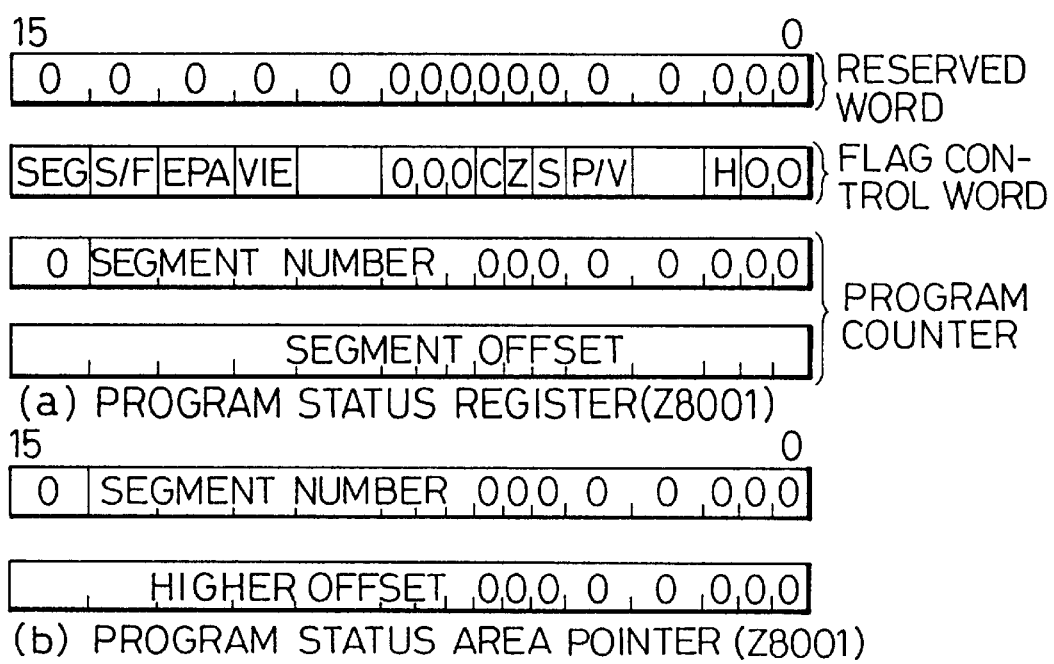
FIG. 11b is a view showing the structure of a special purpose register which is included in the third example of the prior art device.
Figure 12:
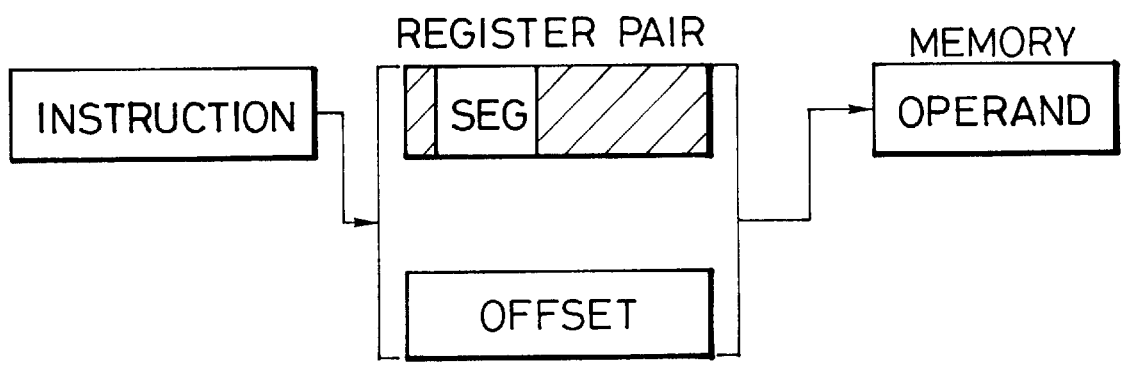
FIG. 12 is a view explaining the generation of a 24 bit effective address according to the third example (Z 8001) of the prior art device of this invention.

According to the above mentioned structure, in a 16 M byte address space shown in FIG. 6, the front 16K byte addresses (addresses 000000 to 003FFF) and the last 16K byte addresses (addresses FFC000 to FFFFFF) are always specified. On the other hand, four regions, each of which is comprised of 8K bytes, can be set in the variable region as desired, which is between the front and last regions. As a result, it becomes possible to store common data, which are commonly accessible by a large number of routines in a program, in the above mentioned fixed regions, and to store data, which are peculiar to a particular routine, in the variable area. In the areas other than those areas mentioned above, i.e., addresses 100000 to EFFFFF, the access method using two 16 bit general purpose registers can be executed. In this case, of course, the execution of this method is switched using an addressing mode.

The memory indirect addressing mode of the second embodiment is carried out in the same way as the execution of the register indirect addressing mode mentioned above.

In summary, according to the present invention, only one general purpose register is required to construct one address pointer, while two 16 bit general purpose registers are always required in the prior art devices. In the present invention, therefore, another register, which is not always required to construct an address pointer, can be used for other purposes. As a result, a finite number of general purpose registers can be used efficiently. For example, operands can be written in the general purpose register, resulting in decrease of operands which should be written in a memory. Accordingly, in the instruction processing unit of this invention, the frequency of memory access become smaller and the speed of access execution becomes faster. In addition, the object efficiency of this unit is greatly improved.

Furthermore, in the instruction processing unit of this invention, the selection between the first and the second address generation means is carried out easily using an addressing mode. So, both modes, one of which uses the first address generation means and another of which uses the second address generation means, coexist in a program, thus providing an instruction processing unit having a high programming efficiency.

What is claimed is:

1. An instruction processing unit for generating addresses to designate an entire address space of an external memory, comprising:

a first register group having at least one register whose bit width is enough for designating a desired address in the entire address space of said external memory;

a second register group having at least one register whose bit width is not enough for designating a desired address in the entire address space of said external memory; and operation means having a function to create operand addresses according to values which are stored in a register or a plurality of registers connected together in said first or second register group, said registers being specified by instruction words;

wherein said operation means further includes first address generation means to create desired operand addresses according to values which are obtained from all the bits of said one or more registers in said first register group, or values which are obtained by extracting a desired amount of bits from at least one register of said one or more registers in said first register group in accordance with a register indirect addressing mode; and second address generation means to create desired operand addresses, which are to designate addresses in at least one partial space of said entire address space, according to the values stored in at least one register of said one or more registers in said second register group by creating a required amount of bits so as to obtain a bit width which is enough for designating a desired address in said entire address space, said created bits having values corresponding to a part of said values stored in at least one register of said one or more registers in said second register group in accordance with the register indirect addressing mode;

wherein there are provided different instructions for creating desired operand addresses respectively by way of said first address generation means and said second address generation means, wherein each of said instructions includes information as to which of said first address generation means or said second address generation means is to be used for generating said desired operand addresses, and wherein said first and second register groups include at least two registers respectively, each of which is connected to the other in order to make a register having larger bits according to instruction word from said operation means.

2. An instruction processing unit for generating addresses to designate an entire address space of an external memory, comprising:

a first register group having at least one register whose bit width is enough for designating a desired address in the entire address space of said external memory;

a second register group having at least one register whose bit width is not enough for designating a desired address in the entire address space of said external memory; and operation means having two functions, one of which is to create an operand address according to values stored in a register or a plurality of registers connected together in said first or second register group, said one or more registers being specified by instruction words, and another of which is to create an operand address indirectly according to read out values from said external memory which are obtained by accessing said external memory using values stored in said one or more registers connected together in said first or second register group, said one or more registers being specified by said instruction words;

wherein said operation means further includes first address generation means to generate desired operand addresses according to values which are obtained from all the bits of at least one register of said one or more registers in said first register group, read out values from said external memory, or values which are obtained by extracting a required amount of bits from said two kinds of values in accordance with a register indirect addressing mode; and second address generation means to create operand addresses, which are to designate addresses in at least one partial space of said entire address space, according to the values stored in at least one register of said one or more registers in said second register group or the values stored in said external memory by creating a required amount of bits so as to obtain a bit width which is enough for designating a desired address in said entire address space, said created bits having values corresponding to a part of said values stored in said at least one of said one or more registers in said second register group or said values stored in said external memory in accordance with the register indirect addressing mode;

wherein there are provided different instructions for creating desired operand addresses respectively by way of said first address generation means and said second address generation means, wherein each of said instructions includes information as to which of said first address generation means or said second address generation means is to be used for generating said desired operand addresses, and wherein said first and second register groups include at least two registers respectively, each of which is connected to the other in order to make a register having larger bits according to instruction word from said operation means.

3. An instruction processing unit for generating addresses to designate an entire address space of an external memory, comprising:

a first register group having at least one register whose bit width is enough for designating a desired address in the entire address space of said external memory;

a second register group having at least one register whose bit width is not enough for designating a desired address in the entire address space of said external memory; and operation means having two functions, one of which is to create an operand address according to values stored in a register or a plurality of registers connected together in said first or second register group, said one or more registers being specified by instruction words, and another of which is to create an operand address indirectly according to read out values from said external memory which are obtained by accessing said external memory using values stored in said one or more registers connected together in said first or second register group, said one or more registers being specified by said instruction words;

wherein said operation means further includes first address generation means to generate desired operand addresses according to values which are obtained from all the bits of at least one register of said one or more registers in said first register group, read out values from said external memory, or values which are obtained by extracting a required amount of bits from said two kinds of values in accordance with a register indirect addressing mode; and second address generation means to create operand addresses, which are to designate addresses in at least one partial space of said entire address space, according to the values stored in at least one register of said one or more registers in said second register group or the values stored in said external memory by creating a required amount of bits so as to obtain a bit width which is enough for designating a desired address in said entire address space, said created bits having values corresponding to a part of said values stored in said at least one of said one or more registers in said second register group or said values stored in said external memory in accordance with the register indirect addressing mode;

wherein there are provided different instructions for creating desired operand addresses respectively by way of said first address generation means and said second address generation means, wherein each of said instructions includes information as to which of said first address generation means or said second address generation means is to be used for generating said desired operand addresses;

wherein said function, which is to create an operand address indirectly according to read out values from said memory which are obtained by accessing said memory using values stored in a register or a plurality of registers connected together in said first or second group, said registers being specified by said instruction words, is executed repeatedly.

4. An instruction processing unit for generating addresses to designate an entire address space of an external memory, comprising:

a first register group having at least one register whose bit width is enough for designating a desired address in the entire address space of said external memory;

a second register group having at least one register whose bit width is not enough for designating a desired address in the entire address space of said external memory; and operation means having two functions, one of which is to create an operand address according to values stored in a register or a plurality of registers connected together in said first or second register group, said one or more registers being specified by instruction words, and another of which is to create an operand address indirectly according to read out values from said external memory which are obtained by accessing said external memory using values stored in said one or more registers connected together in said first or second register group, said one or more registers being specified by said instruction words;

wherein said operation means further includes first address generation means to generate desired operand addresses according to values which are obtained from all the bits of at least one register of said one or more registers in said first register group, read out values from said external memory, or values which are obtained by extracting a required amount of bits from said two kinds of values in accordance with a register indirect addressing mode; and second address generation means to create operand addresses, which are to designate addresses in at least one partial space of said entire address space, according to the values stored in at least one register of said one or more registers in said second register group or the values stored in said external memory by creating a required amount of bits so as to obtain a bit width which is enough for designating a desired address in said entire address space, said created bits having values corresponding to a part of said values stored in said at least one of said one or more registers in said second register group or said values stored in said external memory in accordance with the register indirect addressing mode;

wherein there are provided different instructions for creating desired operand addresses respectively by way of said first address generation means and said second address generation means, wherein each of said instructions includes information as to which of said first address generation means or said second address generation means is to be used for generating said desired operand addresses, and wherein said second address generation means creates a required amount of bits which are deficient for address designation by extending the bit with of the highest bit of read out data obtained from one or more registers in said second register group or obtained from said memory, in order to generate an operand address for a desired partial space of said entire address space.

5. An instruction processing unit for generating addresses to designate an entire address space of an external memory, comprising:

a first register group having at least one register whose bit width is enough for designating a desired address in the entire address space of said external memory;

a second register group having at least one register whose bit width is not enough for designating a desired address in the entire address space of said external memory; and operation means having two functions, one of which is to create an operand address according to values stored in a register or a plurality of registers connected together in said first or second register group, said one or more registers being specified by instruction words, and another of which is to create an operand address indirectly according to read out values from said external memory which are obtained by accessing said external memory using values stored in said one or more registers connected together in said first or second register group, said one or more registers being specified by said instruction words;

wherein said operation means further includes first address generation means to generate desired operand addresses according to values which are obtained from all the bits of at least one register of said one or more registers in said first register group, read out values from said external memory, or values which are obtained by extracting a required amount of bits from said two kinds of values in accordance with a register indirect addressing mode; and second address generation means to create operand addresses, which are to designate addresses in at least one partial space of said entire address space, according to the values stored in at least one register of said one or more registers in said second register group or the values stored in said external memory by creating a required amount of bits so as to obtain a bit width which is enough for designating a desired address in said entire address space, said created bits having values corresponding to a part of said values stored in said at least one of said one or more registers in said second register group or said values stored in said external memory in accordance with the register indirect addressing mode;

wherein there are provided different instructions for creating desired operand addresses respectively by way of said first address generation means and said second address generation means, wherein each of said instructions includes information as to which of said first address generation means or said second address generation means is to be used for generating said desired operand addresses, and wherein said second address generation means creates a required amount of bits which are deficient for address designation, based on values obtained from a conversion table, which is prepared in advance, and said values obtained from said conversion table are specified according to a part of bit values of data, which are read out from said one or more registers in said second register group or from said memory, in order to generate an operand address for a desired partial space of said entire address space.

6. An instruction processing unit for generating addresses to designate an entire address space of an external memory, comprising:

a first register group having at least one register whose bit width is enough for designating a desired address in the entire address space of said external memory;

a second register group having at least one register whose bit width is not enough for designating a desired address in the entire address space of said external memory; and operation means having a function to create operand addresses according to values which are stored in a register or a plurality of registers connected together in said first or second register group, said registers being specified by instruction words;

wherein said operation means further includes first address generation means to create desired operand addresses according to values which are obtained from all the bits of said one or more registers in said first register group, or values which are obtained by extracting a desired amount of bits from at least one register of said one or more registers in said first register group in accordance with a register indirect addressing mode; and second address generation means to create desired operand addresses, which are to designate addresses in at least one partial space of said entire address space, according to the values stored in at least one register of said one or more registers in said second register group by creating a required amount of bits so as to obtain a bit width which is enough for designating a desired address in said entire address space, said created bits having values corresponding to a part of said values stored in at least one register of said one or more registers in said second register group in accordance with the register indirect addressing mode;

wherein there are provided different instructions for creating desired operand addresses respectively by way of said first address generation means and said second address generation means, wherein each of said instructions includes information as to which of said first address generation means or said second address generation means is to be used for generating said desired operand addresses, and wherein said bits created by said second address generation means have the same value as that of the highest bit of said values stored in one or more registers in said second register group or the values stored in said memory.

7. An instruction processing unit for generating addresses to designate an entire address space of an external memory, comprising:

a first register group having at least one register whose bit width is enough for designating a desired address in the entire address space of said external memory;

a second register group having at least one register whose bit width is not enough for designating a desired address in the entire address space of said external memory; and operation means having a function to create operand addresses according to values which are stored in a register or a plurality of registers connected together in said first or second register group, said registers being specified by instruction words;

wherein said operation means further includes first address generation means to create desired operand addresses according to values which are obtained from all the bits of said one or more registers in said first register group, or values which are obtained by extracting a desired amount of bits from at least one register of said one or more registers in said first register group in accordance with a register indirect addressing mode; and second address generation means to create desired operand addresses, which are to designate addresses in at least one partial space of said entire address space, according to the values stored in at least one register of said one or more registers in said second register group by creating a required amount of bits so as to obtain a bit width which is enough for designating a desired address in said entire address space, said created bits having values corresponding to a part of said values stored in at least one register of said one or more registers in said second register group in accordance with the register indirect addressing mode;

wherein there are provided different instructions for creating desired operand addresses respectively by way of said first address generation means and said second address generation means, wherein each of said instructions includes information as to which of said first address generation means or said second address generation means is to be used for generating said desired operand addresses, and wherein said bits created by said second address generation means have values which are chosen according to a predetermined conversion table and wherein said predetermined conversion table being designated by partial bits of the instruction for accessing the memory.

8. The instruction processing unit as claimed in claim 7, wherein said conversion table is constructed so that each value in said table specifies a particular partial space in said memory.

9. An instruction processing unit for generating addresses to designate an entire address space of an external memory, comprising:

a register file having at least two registers, each of which has a bit width shorter than the width of an address word to designate a desired address in said entire address space, said at least two registers having a bit width longer than said address word when said at least two registers are connected together to function as one register; and operation means having a function of creating operand addresses according to values stored in one or more registers of said at least two registers in said register file;

wherein said operation means further includes first address generation means to create desired operand addresses according to said values stored in said at least two registers that are connected together, or values which are obtained by extracting a desired amount of bits from said at least two registers that are connected together; and second address generation means to create desired operand addresses, which are to designate addresses in at least one partial space of said entire address space, according to the values stored in said one register by supplementing a required amount of bits to these values so as to obtain a bit width which is enough for designating a desired address in said entire address space, said supplementing bits having values corresponding to a part of said values stored in said one register;

wherein there are provided different instructions for creating desired operand addresses respectively by way of said first address generation means and said second address generation means, and wherein each of said instructions includes information as to which of said first address generation means or said second address generation means is to be used for generating said desired operand addresses.

10. The instruction processing unit as claimed in claim 9, wherein said supplementing bits created by said second address generation means have the same value as that of the highest bit of said values stored in said register.

11. The instruction processing unit as claimed in claim 9, wherein said supplementing bits created by said second address generation means have values which are chosen according to a predetermined conversion table.

12. The instruction processing unit as claimed in claim 11, wherein said conversion table is so constructed that each value in said table specifies a particular partial space of said memory.

13. An instruction processing unit for generating addresses to designate an entire address space of an external memory, comprising:

a register file having at least two registers, each of which has a bit width shorter than the width of an address word to designate a desired address in said entire address space, said at least two registers having a bit width longer than said address word when said at least two registers are connected together to function as one register; and operation means having two functions, one function of creating operand addresses according to values stored in one or more registers of said at least two registers in said register file and a second function of creating an operand address indirectly according to read out values from said external memory which are obtained by accessing said external memory using values stored in said one or more registers of said at least two registers in said register file;

wherein said operation means further includes first address generation means to create desired operand addresses according to said values stored in said at least two registers that are connected together, or values which are obtained by extracting a desired amount of bits from said at least two registers that are connected together; and second address generation means to create desired operand addresses, which are to designate addresses in at least one partial space of said entire address space, according to the values stored in a register in said register file or the values stored in said external memory by supplementing a required amount of bits to these values so as to obtain a bit width which is enough for designating a desired address in said entire address space, said supplementing bits having values corresponding to a part of said values stored in said register;

wherein there are provided different instructions for creating desired operand addresses respectively by way of said first address generation means and said second address generation means, and wherein each of said instructions includes information as to which of said first address generation means or said second address generation means is to be used for generating said desired operand addresses.

14. The instruction processing unit as claimed in claim 13, wherein all the bit values of said supplementing bits are "1" when the highest bit value of said register is "1" while they are "0" when the highest bit value of said register is "0".

15. The instruction processing unit as claimed in claim 13, wherein said supplementing bits created by said second address generation means have the same value as that of the highest bit of said values stored in said register.

16. The instruction processing unit as claimed in claim 13, wherein said supplementing bits created by said second address generation means have values which are chosen according to a predetermined conversion table.

17. The instruction processing unit as claimed in claim 16, wherein said conversion table is so constructed that each value in said table specifies a particular partial space of said memory.

18. An instruction processing unit for generating addresses to designate an entire address space of an external memory, comprising:

a first register group having at least one register whose bit width is enough for designating a desired address in the entire address space of said external memory;

a second register group having at least one register whose bit width is not enough for designating a desired address in the entire address space of said external memory; and operation means having two functions, one of which is to create an operand address according to values stored in a register or a plurality of registers connected together in said first or second register group, said one or more registers being specified by instruction words, and another of which is to create an operand address indirectly according to read out values from said external memory which are obtained by accessing said external memory using values stored in said one or more registers connected together in said first or second register group, said one or more registers being specified by said instruction words;

wherein said operation means further includes first address generation means to generate desired operand addresses according to values which are obtained from all the bits of at least one register of said one or more registers in said first register group, read out values from said external memory, or values which are obtained by extracting a required amount of bits from said two kinds of values in accordance with a register indirect addressing mode; and second address generation means to create operand addresses, which are to designate addresses in at least one partial space of said entire address space, according to the values stored in at least one register of said one or more registers in said second register group or the values stored in said external memory by creating a required amount of bits so as to obtain a bit width which is enough for designating a desired address in said entire address space, said created bits having values corresponding to a part of said values stored in said at least one of said one or more registers in said second register group or said values stored in said external memory in accordance with the register indirect addressing mode;

wherein there are provided different instructions for creating desired operand addresses respectively by way of said first address generation means and said second address generation means, wherein each of said instructions includes information as to which of said first address generation means or said second address generation means is to be used for generating said desired operand addresses, and wherein said bits created by said second address generation means have the same value as that of the highest bit of said values stored in one or more registers in said second register group or the values stored in said memory.

19. An instruction processing unit for generating addresses to designate an entire address space of an external memory, comprising:

a first register group having at least one register whose bit width is enough for designating a desired address in the entire address space of said external memory;

a second register group having at least one register whose bit width is not enough for designating a desired address in the entire address space of said external memory; and operation means having two functions, one of which is to create an operand address according to values stored in a register or a plurality of registers connected together in said first or second register group, said one or more registers being specified by instruction words, and another of which is to create an operand address indirectly according to read out values from said external memory which are obtained by accessing said external memory using values stored in said one or more registers connected together in said first or second register group, said one or more registers being specified by said instruction words;

wherein said operation means further includes first address generation means to generate desired operand addresses according to values which are obtained from all the bits of at least one register of said one or more registers in said first register group, read out values from said external memory, or values which are obtained by extracting a required amount of bits from said two kinds of values in accordance with a register indirect addressing mode; and second address generation means to create operand addresses, which are to designate addresses in at least one partial space of said entire address space, according to the values stored in at least one register of said one or more registers in said second register group or the values stored in said external memory by creating a required amount of bits so as to obtain a bit width which is enough for designating a desired address in said entire address space, said created bits having values corresponding to a part of said values stored in said at least one of said one or more registers in said second register group or said values stored in said external memory in accordance with the register indirect addressing mode;

wherein there are provided different instructions for creating desired operand addresses respectively by way of said first address generation means and said second address generation means, wherein each of said instructions includes information as to which of said first address generation means or said second address generation means is to be used for generating said desired operand addresses, and wherein said bits created by said second address generation means have values which are chosen according to a predetermined conversion table, and wherein said predetermined conversion table is designated by partial bits of the instruction for accessing the memory.

20. The instruction processing unit as claimed in claim 19, wherein said conversion table is constructed so that each value in said table specifies a particular partial space in said memory.

* * * * *